United States Patent [19]
Kondo

[11] Patent Number: 6,083,597
[45] Date of Patent: Jul. 4, 2000

[54] INFORMATION RECORDING CARRIER AND MANUFACTURING METHOD THEREOF

[75] Inventor: Tetsuya Kondo, Yokohama, Japan

[73] Assignee: Victor Company of Japan, Ltd., Yokohama, Japan

[21] Appl. No.: 09/123,643

[22] Filed: Jul. 28, 1998

[30] Foreign Application Priority Data

Jul. 29, 1997 [JP] Japan ..................................... 9-218096
Sep. 29, 1997 [JP] Japan ..................................... 9-281384

[51] Int. Cl.$^7$ ........................................................ B32B 3/02
[52] U.S. Cl. ........................ 428/64.1; 428/64.2; 428/64.4; 428/411.1; 428/913; 430/270.12; 430/495.1; 430/945; 369/283; 369/288
[58] Field of Search ................... 428/64.1, 64.2, 428/64.4, 64.5, 64.8, 411.1, 457, 913; 430/270.12, 270.13, 270.14, 495.1, 945; 369/275.1, 275.4, 283, 288

[56] References Cited

U.S. PATENT DOCUMENTS

| | | | |
|---|---|---|---|
| 5,312,663 | 5/1994 | Kosinski et al. | 428/64.1 |
| 5,340,698 | 8/1994 | Hirata et al. | |
| 5,422,226 | 6/1995 | Aijhara et al. | 430/273 |

FOREIGN PATENT DOCUMENTS

| | | |
|---|---|---|
| 0 280 531 | 8/1988 | European Pat. Off. . |
| 0 526 224 | 2/1993 | European Pat. Off. . |
| 0 548 968 | 6/1993 | European Pat. Off. . |
| 0 598 575 | 5/1994 | European Pat. Off. . |
| 0 603 779 | 6/1994 | European Pat. Off. . |
| 0 652 555 | 5/1995 | European Pat. Off. . |
| 0 680 039 | 11/1995 | European Pat. Off. . |
| 4-285736 | 10/1992 | Japan . |
| 5-81702 | 4/1993 | Japan . |
| 6-187664 | 7/1994 | Japan . |
| 8-96420 | 4/1996 | Japan . |
| 9-035348 | 2/1997 | Japan . |

*Primary Examiner*—Elizabeth Evans
*Attorney, Agent, or Firm*—Eugene Lieberstein; Michael N. Meller

[57] ABSTRACT

An information recording carrier has a substrate with at least one fine pattern row. On the substrate, a recording layer, a delamination-proof layer and a protective layer are sequentially superposed. In manufacturing, firstly, the recording layer is formed on the substrate. A first resin is then applied onto the recording layer. The first resin is then cured to form the delamination-proof layer. A second resin is next applied onto the delamination-proof layer. The second resin is then cured to form the protective layer.

14 Claims, 2 Drawing Sheets

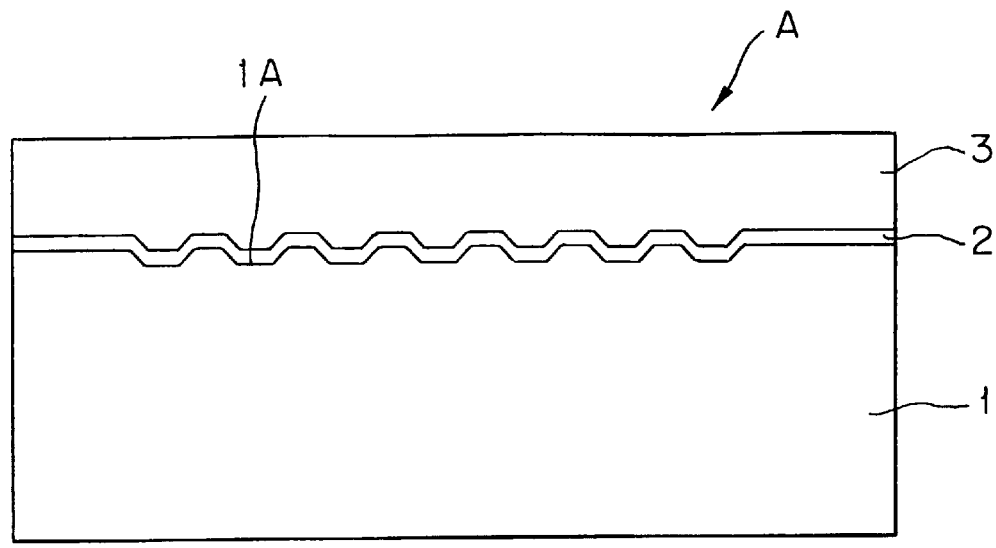
F I G. 1
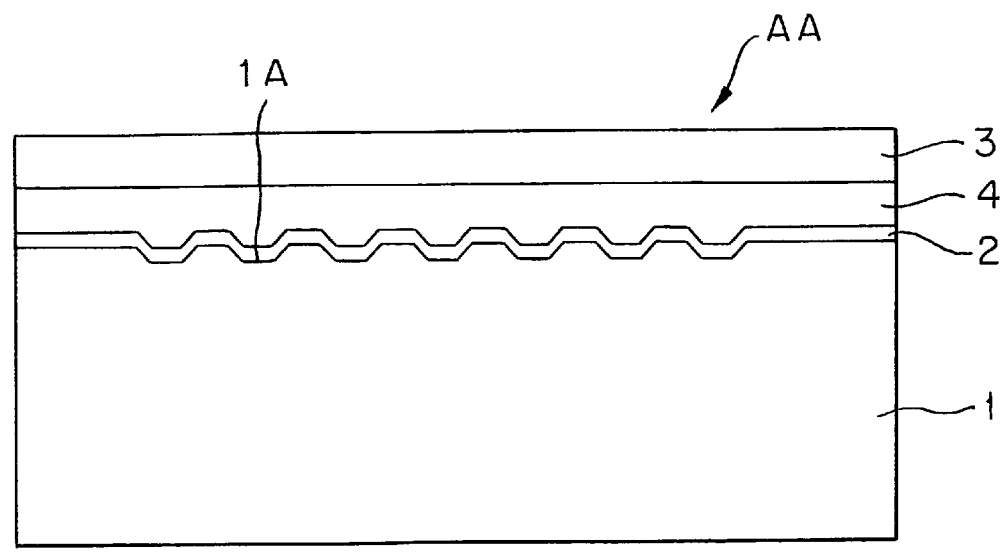
F I G. 2

|  | Delamination-proof layer 4 | Protective layer 3 | Result of delamination test |
|---|---|---|---|
| Test Sample 1 | Resin α | Resin β | NG |
| Test Sample 2 | Resin β | Resin α | NG |
| Test Sample 3 | Resin A | Resin α | NG |
| Embodiment 1 | Resin B | Resin α | OK |
| Embodiment 2 | Resin C | Resin α | OK |
| Embodiment 3 | Resin D | Resin α | OK |
| Embodiment 4 | Resin E | Resin α | OK |
| Embodiment 5 | Resin B | Resin β | OK |
| Embodiment 6 | Resin C | Resin β | OK |
| Embodiment 7 | Resin D | Resin β | OK |
| Embodiment 8 | Resin E | Resin β | OK |
| Test Sample 4 | Resin β | Resin B | NG |
| Test Sample 5 | Resin β | Resin C | NG |
| Test Sample 6 | Resin β | Resin D | NG |
| Test Sample 7 | Resin β | Resin E | NG |
| Test Sample 8 |  | Resin α | NG |
| Test Sample 9 |  | Resin β | NG |
| Test Sample 10 |  | Resin α | NG |
| Test Sample 11 |  | Resin β | NG |

FIG. 3

INFORMATION RECORDING CARRIER AND MANUFACTURING METHOD THEREOF

BACKGROUND OF THE INVENTION

The present invention relates to an information recording carrier such as an optical disc and a manufacturing method thereof.

Conventionally, there have been disc information recording carriers for recording readable information and for reading the recorded information, and in recent years, the density of disc information recording carriers has grown considerably. Information recording carriers encompass a variety of discs such as magnetic discs, optical discs, electrostatic capacity discs and the like; in particular, the development in optical disc has been remarkable.

The opportunities for recording important information onto these high-density information recording carriers have increased with the recent increasing in performance of personal computers. However, security problems still remain.

These high-density information recording carriers have the major advantage in that large amounts of information can be recorded on one disc. However, they have a disadvantage of easily being duplicated with commercially available production equipment. In particular, the original disc of a high-density information on people's property such as customers' bank deposit, electronic money is liable to be stolen, and copied (counterfeited) in large numbers for distribution to interested parties. Complete prevention of such crime is impossible. So, there always remains the risk of violation of customer privacy and a sense of unease in financial dealings. This, in return, affects the stability of business dealings, and can result in a loss of confidence financial dealings.

Accordingly, a method for preventing the unlawful duplication of high-density information recording carriers loaded with important information, has been required. As means to solve this problem, there have been proposed various copy protection systems using ciphers. These systems protects the information against electronic copying. The advance of ciphers has made it difficult to copy the information. In response to this, a physical method come to be used for unlawful copying. In this method, the disc is delaminated, exposing the information surface, and thus the information is transferred to another disc. The disc is used as a mold to transfer the signal onto another flat plastic disc. This mold can be repeatedly used, making it possible to make numerous signal patterns exactly the same as the original. Thus, apart from electronic copying, there also is a physical method for copying the entire information, and there is still no means for preventing this.

FIG. 1 illustrates the construction of an optical disc. As shown in FIG. 1, an optical disc A is constructed by sequentially superposing a recording layer 2 (a reflective film), and a protective layer 3 on a substrate 1. The signal surface on the substrate 1 includes fine pattern rows 1A. In optical disc such as disc A, the interface between the substrate 1 and the recording layer 2 can be delaminated. In general, the protective layer 3 is made to achieve sufficient adhesion with the recording layer 2, and is hard enough to function as a protective layer. The interface between the substrate 1 and the recording layer 2, however, has weak adhesion, and the surface of the substrate 1 can be exposed by delaminating the disc carefully with an adhesive tape. The recording layer 2 is formed on the substrate 1 by an evaporation or sputtering method or the like, the latter of which while achieving good adhesion, is weak enough to allow the signal surface to be exposed with an adhesive tape.

SUMMARY OF THE INVENTION

It is an object of the present invention to provide an information recording carrier of a construction capable of preventing a physical copying (counterfeiting) by preventing delaminating of the recording layer 2 at the interface between the substrate 1 and the recording layer 2 even when an adhesive tape is used, and to provide a manufacturing method thereof.

The present invention provides an information recording carrier having a substrate with at least one fine pattern row, comprising a recording layer, a delamination-proof layer and a protective layer sequentially superposed on the substrate.

Furthermore, the present invention provides a method of manufacturing an information recording carrier comprising the steps of: forming a recording layer on a substrate with at least one fine pattern row; applying a first resin onto the recording layer; curing the first resin applied onto the recording layer to form a delamination-proof layer; applying a second resin onto the delamination-proof layer; and curing the second resin applied onto the delamination-proof layer to form a protective layer.

BRIEF DESCRIPTION OF THE DRAWINGS

FIG. 1 illustrates the construction of a conventional optical disc;

FIG. 2 illustrates the construction of an information recording carrier according to the present invention; and FIG. 3 is a table explaining the results of the delamination tests in Embodiments 1–8 and Test Samples 1–11.

DETAILED DESCRIPTION OF THE PREFERRED EMBODIMENTS

Referring to the drawings, an information recording carrier and a manufacturing method thereof according to the present invention will be described below. The parts corresponding to the parts described above will be identified with the same numerals and the explanation thereof will be omitted.

The information recording carrier and the manufacturing method thereof according to the present invention will be described below in the order of: (1) Information recording carrier (Embodiments 1–8); (2) Manufacturing method of Information recording carrier; and (3) Information recording carrier (Embodiments 9–19).

(1) Information Recording Carrier

An information recording carrier according to the present invention is an optical disc AA shown in FIG. 2 which includes a delamination-proof layer 4 which will be described later, interposed between the recording layer 2 and the protective layer 3 with no gap. In other words, the optical disc AA, an information recording carrier according to the present invention, as shown in FIG. 2, is constructed by sequentially superposing the recording layer 2 (a reflective layer), the delamination-proof layer 4 and the protective layer 3 on the substrate 1. The signal surface on the substrate 1 includes the fine pattern rows 1A.

The delamination-proof layer 4 is interposed between the recording layer 2 and the protective layer 3 to make it impossible to deliminate at the interface between the substrate 1 and the recording layer 2. This can be achieved because the delamination-proof layer 4 and the protective layer 3 use resins having different stretch rates. The delamination-proof layer 4 uses a flexible resin with stretch rates of 100% to 300%, while the protective layer 3 uses an inflexible resin with a stretch rate of 5% or less. Thus, delamination at the interface between the substrate 1 and the recording layer 2 is impossible as any shearing force stemming from delamination at the protective layer 3 is dispersed and absorbed on the lower layer (delamination-proof layer 4).

If a flexible resin with a stretch rate of more than 5% is used as the protective layer 3, the surface of the protective layer 3 will become extremely soft and susceptible to scratches made on the outside; therefore the hard protective layer 3 is formed with a stretch rate of 5% or less.

In microscopic examination of the disc after the delamination test indicated that the upper layer (protective layer 3) had been broken and fragments of this remained strongly adhered to the lower layer (delamination-proof layer 4). No evidence of delamination of the lower layer was found. Since the adhesion between the delamination-proof layer 4 and the recording layer 2 remains stable at all times, delamination at the interface between the substrate 1 and the recording layer 2 is impossible. Thus, unlawful copying of the optical disc AA with the substrate 1 can be prevented with a great degree of certainty.

Comparison of Embodiments 1–8 with Test Samples 1–11

Embodiment 1–8 of the information recording carrier according to the present invention will be described in comparison with Test Samples 1–7.

Embodiments 1–8

The optical disc AA in these embodiments are applied to a CD-ROM.

The substrate 1 of the optical disc AA was made of polycarbonate with a thickness of 1.2 mm. The fine pattern rows 1A were engraved on the surface of the substrate 1 in spiral fashion or concentric fashion. The fine pattern lows 1A (a line width of 0.6 $\mu$m) were engraved as information. The recording layer 2 using aluminum and with a thickness of 70 nm, was formed on the substrate 1 by sputtering. The delamination-proof layer 4, with a thickness of 5 $\mu$m–10 $\mu$m was formed on the top of the recording layer 2. The protective layer 3, with a thickness of 5 $\mu$m–10 $\mu$m, was formed on top of the delamination-proof layer 4.

The delamination-proof layer 4 and the protective layer 3 comprised Resin A–Resin E, Resin $\alpha$, and Resin $\beta$ which will be described below, and all of the resins were adjusted to cure with exposure to ultraviolet light. The delamination-proof layer 4 was formed by applying Resins B, C, D and E onto the recording layer 3 (spin coating) and curing the applied Resins B, C, D and E (ultraviolet irradiation). The protective layer 3 was formed by applying Resins $\alpha$ and $\beta$ onto the cured delamination-proof layer 4 (spin coating) and curing the applied Resins $\alpha$ and $\beta$ (ultraviolet irradiation). A 2,000 mJ ultraviolet of a high-pressure mercury-arc lamp was used for irradiation.

The procedure for the delamination test as shown in FIG. 3, involves scratching the surface of the protective layer 3 with a cutter knife in increment of 1 mm to form a grid pattern of horizontal and vertical lines, thereby forming 100 squares (test pieces). Scratches are thus made on the surfaces of the delamination-proof layer 4, the recording layer 2 and the substrate 1. The operations carried out up to this point were the same as those described in JIS-K5400. In JIS-K5400, the number of squares delaminated after cutting were counted for scoring, while in this delamination test for the information recording carrier (the optical disc AA) according to the present invention, a "Scotch" polyimide tape 5413 (with an adhesive force of 700 g/25 mm) was stuck onto the squares and then removed.

This test was carried out on the same spot ten times, and even if a single square was delaminated, the square would be designated as "No Good (NG)". The procedure of the test is much more severe than that of JIS-K5400. The procedure involved the cutting of the protective layer 3 with a cutter knife, and repeated delamination attempts were conducted on the same spot of the protective layer 3 with tape, thereby greatly increasing the chance of a fine protective layer 3 from being peeled.

The delamination-proof layer 4 and the protective layer 3 comprised a combination of resin: Resin A–Resin E, Resin $\alpha$, and Resin $\beta$ as shown in FIG. 3. In FIG. 3, "NG" indicates a delamination occurring between the substrate 1 and the recording layer 2, while "OK" indicates that no delamination occurred between the substrate 1 and the recording layer 2.

As shown in FIG. 3, in Embodiments 1–4, Resins B, C, D and E were used to comprise the delamination-proof layer 4, while Resin $\alpha$ was used to comprise the protective layer 3. In Embodiments 5–8, Resins B, C, D and E were used to comprise the delamination-proof layer 4, while Resin $\beta$ was used to comprise the protective layer 3. The results for the delamination tests in Embodiments 1–8 were satisfactory ("OK").

Resin A—A stretch rate of 50% (3% of photo initiator Darocur 1173 (Merck Japan Limited) was added to a monomer, M-5500 (Toagosei Chemical Industry).)

Resin B—A stretch rate of 100% (An ultraviolet curing type composition, UV-3630 (Toagosei Chemical Industry))

Resin C—A stretch rate of 150% (3% of photo initiator Darocur 1173 (Merck Japan Limited) was added to a monomer, CL-50 (Nippon Kayaku Co., Ltd.).)

Resin D—A stretch rate of 200% (3% of photo initiator Darocur 1173 (Merck Japan Limited) was added to a monomer, U-340A (Shin-Nakamura Chemical Co., Ltd.).)

Resin E—A stretch rate of 300% (3% of photo initiator Darocur 1173 (Merck Japan Limited) was added to a monomer, M-5700 (Toagosei Chemical Industry).)

Resin $\alpha$—A stretch of 0–5%. This margin of error occurs because the value is very small. (An ultraviolet curing type composition, SD-1700 (Dainippon Ink and Chemicals, Inc.))

Resin $\beta$—A stretch rate of 0–5%. This margin of error occurs because the value is very small. (An ultraviolet curing type composition, XR-11 (Sumitomo Chemical Co., Ltd.))

The measurement of stretch rate is carried out according to JIS K-6301.

Test Samples 1–7

In the Test Samples 1–7, the resins used for the delamination-proof layer 4 and the protective layer 3 were different from those used in Embodiments 1–8. Other than this, the discs for Test Samples 1–7 were of similar construction to those used in Embodiments 1–8. As shown in FIG. 3, for Test Samples 1–7, Resins $\alpha$, $\beta$, A, $\beta$, $\beta$, $\beta$ and $\beta$ comprised the delamination-proof layer 4, and Resins $\beta$, $\alpha$, $\alpha$, B, C, D and E comprised the protective layer 3. All the results of the delamination tests for Test Samples 1–7 were "NG".

Test Samples 8–11

In test Samples 8–11, appropriate thicknesses and resins were chosen for the protective layer 3 in the optical disc A as shown in FIG. 1. The substrate 1 of the optical disc A was made of polycarbonate with a thickness of 1.2 mm, and the recording layer 2 was made of aluminum with a thickness of 70 nm. As shown in FIG. 3, for the protective layer 3, Test Sample 8 used Resin α with a thickness of 8 µm; Test Sample 9 used Resin β with a thickness of 8 µm; Test Sample 10 used Resin α with a thickness of 16 µm; and Test Sample 11 used Resin β with a thickness of 16 µm. All the results of the delamination tests for Test Samples 8–11 were "NG".

All the results of the delamination tests of Embodiments 1–8 were "OK", while all the results of the delamination tests for Test Samples 1–11 were "NG". Thus by using the resins in Embodiments 1–8 in the delamination-proof layer 4 and the protective layer 3, the delamination-proof layer 4 and the recording layer 2 can be kept in securely adhered state at all times, making it impossible to delaminate at the interface between the substrate 1 and the recording layer 2. In this way, a reliable method for preventing the unlawful copying of the optical disc AA with the substrate 1 is achieved.

As described above, no delamination was found in the discs constructed by superposing a resin delamination-proof layer 4 with a stretch rate of 100% to 300% and a resin protective layer 3 with a stretch rate 5% or less, indicating that delamination-proofing had been achieved. While only the delamination-proof layers 4 made of a resin with a stretch rate of up to 300% is shown, those made of a resin with a stretch rate of more than this (300% to 1000%) will also achieve the same results. The resin is made up of a monomer, the main ingredient and a polymerization initiator for curing. In Resin E, for example, the monomer is M-5700 while the polymerization initiator is Darocur 1173. Resin B, Resin α and Resin β are composites including an initiator. The stretch rate, a most important characteristic of the present invention, is determined mainly by the type of the monomer used. However, in view of applicability, various unsaturated ethylene resins may be added for adjusting viscosity, but in amounts within the range specified by the present invention. Furthermore, various types of monomer may be added as a binder but in amounts within the range specified by the present invention.

Care must be taken over permeability of the protective layer 3 and the delamination-proof layer 4 of an optical disc of the type from which data is read from the signal surface side, like Embodiment 13 which will be described later. In detail, light beams within a wavelength of laser used for data reading or writing are emitted from a pickup lens, transmitted through the protective layer 3 and the delamination-proof layer 4, aimed at the recording layer 2, reflected therefrom, transmitted through the delamination-proof layer 4 and the protection layer 3, and returned to the pickup lens. The protective layer 3 and the delamination-proof layer 4 requier the permeability of at least 70% to allow the light beams to pass therethrough. The permeability below 70% will cause decrease in signal output almost half (0.7×0.7= 0.49). A desirable permeability of the protective layer 3 and the delamination-proof layer 4 is 90% or more for a recording layer 2 of low reflectivity.

The permeability can be measured with a test piece of silica glass and another test piece made by laminating the delamination-proof layer 4 and the protective layer 3 on silica glass in order. Quantities of light transmitted through the two test pieces are measured by a transmission-type monochrometer that covers wavelengths in the range of infrared rays to ultraviolet rays. The monochrometer decides the permeability with a ratio of the quantity of light transmitted through one of the test pieces to the other. A measurable wavelength is one for recording or reproducing laser wavelength, for example, 830 nm, 780 nm, 650 nm, 635 nm, 532 nm 430 nm, 410 nm and 370 nm.

Examples of the unsaturated ethylene resins include mono-function acrylate (methacrylate), 2-function acrylate (methacrylate), 3-function acrylate (methacrylate), 4-function acrylate (methacrylate), 6-function acrylate (methacrylate) and the like. Specifically, examples of the single function acrylate include 2-ethylhexylacrylate, 2-hydroxyethylacrylate, N-vinylpyrrolidone, t-butylacrylate and isbornylacrylate. Examples of the 2-function acrylate include ethyleneglycoldiacrylate, polyethyleneglycoldiacrylate, 1,4-butanedioldiacrylate, 1,5-pentanedioldiacrylate, 1,6-hexanedioldiacrylate and 1,10-decanedioldiacrylate. Examples of the 3-function acrylate include trimethylolpropanetriacrylate, pentaerythritoltriacrylate and glyceroltriacrylate. An example of the 4-function acrylate includes tetromethylolmethanetetraacrylate. An example of the 6-function acrylate includes dipentaerythritolhexacrylate. These functional groups (acryloyl) may be replaced by methacryloyl.

The polymerization initiator used in Embodiments was a photo accelerator correspsonding to ultraviolet curing. However, the polymerization accelerator used here is not limited to the Darocur 1173 (2-hydroxy-2-methyl-1-phenylpropane-1-one). The other substances may be used such as benzyl, benzoin, benzophenone, 4-methoxybenzophenone, benzyldimethylketal, benzoinethylether, benzoinisopropylether, millaseketone, anthraquinone, 2-methylanthraquinone, acetophenone, α α-dichlor-4-phenoxyacetophenone, p-tert-butyltrichloroacetophenone, methylorthobenzoylbenzoate, 2-chlorothioxanthone and 2,4-diethylthioxanthone. These polymerization accelerator can be blended not only for ultraviolet curing, but also for γ ray, electron ray and microwave curing. If necessary, an amine compound may be added to these as a polymerization accelerator.

When this polymerization accelerator is used for thermosetting, a general polymerization initiator (e.g., azobisisobutyronitrile) is blended, not the polymerization accelerator mentioned above.

Japanese Patent Laid-Open No. 81702/1993 discloses an information recording carrier with two protective films, the upper surface layer with a high surface hardness and the under (inner) surface layer with adhesion. The construction of the disc described in this document is similar to that of the present invention, but its features a surface layer with a high surface hardness (harder than an HB pencil lead) in order to improve the CSS action of magnetic field modulation type optical magnetic discs, and the examples show the pencil hardnesses of H and 2H.

The Laid-Open patent only describes the inner surface layer as a resin having an excellent adhesion with metal, and mentions no limitations regarding physical properties and materials. SD-101 and SD-301 are given as the examples for protective films but there are generally used for optical discs, and the stretch rate thereof is in the range of 0 to 5%, thus too low to measure. No description is given for stretch rate of both the surface layer and the inner surface layer, and no mention is made of balancing the physical properties of both layers or the relationship between the balance and delamination, and how adjustment of this can be lead to the prevention of delamination. The adhesion tests for Test samples were carried out in accordance with JIS-K5400 the conditions of which are much less stringent than those for the present invention. As described above, an object, a physical properties construction, and effects of the present invention completely different from those of the prior art.

(2) Manufacturing Method for Information Recording Carrier

A manufacturing method for the information recording carrier according to the present invention will be described. The explanation below will focus on a process for forming the delamination-proof layer 4 on the recording layer 2, and a process for forming the protective layer 3 on the delamination-proof layer 4, both essential parts of the present invention. Other processes for manufacturing the disc (the processes for forming the substrate 1 and the recording layer 2) are well known and the explanation thereof will be omitted.

The manufactured method of the information recording carrier according to the present invention may be carried out in the following order: the application of the delamination-proof layer 4 (a flexible layer), onto the recording layer 2 (a reflective layer); the curing of the delamination-proof layer 4; the application of the protective layer 3 onto the delamination-proof layer 4; and the curing of the protective layer 3. The tests showed that adhesion is lowered considerably when the curing of the delamination-proof layer 4 is omitted.

The preferred processes for applying the delamination-proof layer 4 and the protective layer 3 are a spin coating method, a bar coating method, a roll coating method, a spraying method, an immersing method or a printing method. The characteristics of each process applied for the delamination-proof layer are as follows:

While, the spin coating method has an advantage that the film thickness can be easily set by adjusting the rotation speed (rpm) and rotation time. The high viscosity of the delamination-proof layer 4, however, means that the rotation speed needs to be set high, making it not very suitable for mass production. However, it also has an advantage of being able to share conventional optical disc line equipment. In the bar coating method, the film thickness is determined by the roughness of the bars and the scanning speed. It requires simple equipment and can be done quickly, but at the same time there is also a disadvantage that the trace of the bars are easily left behind.

In the roll coating method, the film thickness is determined by the gap between the rolls and the rotation speed, making it possible to provide a fast line architecture even for high viscosities. The method also allows the formation of smooth surface of neat layer. The spraying method requires the lowest equipment cost, but provides a high surface roughness and easily makes the work environment dirty. The immersing method is carried out simply by dipping the disc into a solution which makes for low equipment cost, but the solution also goes onto the back side of the disc. The printing method (e.g., screen printing) is first, provides a high viscosity and covers only the surface of the film which is made neat. Also, the equipment cost is relatively low. After considering the advantages and disadvantages of these film application methods, the user may select the method he or she feels is most appropriate.

The process for curing the delamination-proof layer 4 and the protective layer 3 uses ultraviolet light, as described above, but is not limited thereto. A radiation including visible light, microwaves or a γ ray, or electron rays may be used, all of which allow for fast curing. The process for curing the delamination-proof layer 4 and the protective layer 3 may use an oven heating method. In this method, adding of a heat polymerization initiator is required, and curing can be carried out at a temperature of about 50° C.–150° C. This method requires the curing time 10–100 times longer than that for irradiation by ultraviolet light, electron rays, or microwaves, but the equipment cost is low. The higher the heating temperature, the shorter the curing time. The temperature at which effects are clearly shown is 50° C. or more. Higher temperatures will warp the substrate, affecting the signal reading performance. Polycarbonate has a melting point of 140° C, yet thermosetting in an extremely short time requires temperatures of up to 150° C. In consideration of warping in the substrate, the most preferable curing temperature is 50° C.–80° C. Conventional heating can be used for curing, but infrared heating is effective in that it allows for direct and localized heating.

Embodiments 1–8 described above, are intended to show the basic structure of the present invention, and thus the present invention is not limited to these. For example, a printed film may be applied onto the protective layer 3. Areas for applying the delamination-proof layer 4 and the protective layer 3 on the recording layer 2 may be gradually changed so that the edges of the delamination-proof layer 4 protrude out over the edges of the recording layer 2, and furthermore, the edges of the protective layer 3 protude out over the edges of the delamination-proof layer 4. Also, a scratch-proof layer, and anti-static (electricity) layer, a warp correcting layer, or a moisture-proof layer may also be formed on the reading surface of the substrate 1.

The descriptions concerning Embodiments 1–8 assume the use of read-only optical discs such as CD-ROMs, they are equally applicable to magneto-optical discs (e.g., MD data) or phase change (transition) discs (e.g., PD), or a write-once discs (e.g., CD-R). When such discs are used, the recording layer 2 can be replaced by a film with the appropriate recording function. The described processes may also be applied to discs which change information by sequentially erasing write data or to discs of laminated construction such as DVD-ROM, DVD-RAM and DVD-R. A sophisticated security system may be produced by combining the present invention with an existing copy protecting method.

(3) Information Recording Carrier

The information recording carrier according to the present invention which is applicable for many types of discs will be specifically explained.

The information recording carrier according to the present invention has the same construction as that of the optical disc AA as shown in FIG. 2, and is constructed by sequentially superposing the recording layer 2 (a reflective film), the delamination-proof layer 4 and the protective layer 3 on the substrate 1 having a signal surface with the fine pattern rows 1A.

In addition to this construction, the recording layer 2 is constructed of a single layer or a multi-layer construction including either an optical reflective film, a magneto-optical film, a phase change film, a dye film or any combination thereof. These films can be used for the following discs:

Ready-Only Medium

The read-only medium using the optical reflective film can employ aluminum, gold, silver, copper, nickel, chromium, silicon, titanium, tantalum, an alloy using these metals as a major component, SiN, SiC, SiO, SiON, SiAlON, or the like.

Magneto-Optical Medium

The magneto-optical medium using the optical magnetic film can employ an laminated film with alternating layers of a transition metal such as TbFeCo, GdFeCo, DyFeCo, TbCo and TbFe and a rare earth alloy, or alternating layers of cobalt and platinum. The transition metals can be substituted with Ho, Er, Yb and Lu. Furthermore, Bi and Sn, for example, can be added to the transition metals.

Phase Change Medium

The phase change medium using the phase change film can employ a chalcogen alloy such as GeSbTe, GeTe, GeTeS, GeSnTe, GeSnTeAu, GeSeS, GeSeAs, SbTe, SbSeTe, SeTe, SeAs, InTe, InSe, InSb, InSbSe, InSbTe, AgInSbTe or CuAlTeSb.

Write-Once Dye Medium

The write-once dye medium using the dye film can employ a cyanine dye, a phthalocyanine dye, a naphthalocyanine dye, an azo dye, a naphthoquinone dye or the like.

Write-Once Phase Change Medium

The write-once phase change medium using the phase change film can employ a metal or alloy with a low melting point such as bismuth, TeO or TeC. In order to improve the play-back output, the magneto-optical medium, the phase change medium, the write-once dye medium and the write-once phase change medium may be laminated with an optical interference film (such as SiN, SiO, ZnS, ZnSSiO, AlO, MgF, InO and ZrO) and an optical reflective film (such as aluminum and gold). Also, in order to enable high-density recording/play back, these may be laminated with a known super-resolution mask film or a contrast enhance film.

The following describes embodiments of discs using the magneto-optical medium, the phase change medium, the write-once dye medium and the write-once phase change medium as the recording layer 2.

Embodiment 9

Embodiment 9 is applied to the magneto-optical disc.

The substrate 1 was of acrylic and had a thickness of 1.2 mm. A fine pattern (a groove line width of 1.0 μm; and a track pitch of 1.6 μm) 1A was engraved on the surface of the substrate 1 as information. An optical magnetic film TbFeCo with a thickness of 90 nm, and an optical interference film SiO with a thickness of 80 nm were formed on the signal surface of the substrate 1 by the sputtering method to form the recording layer 2. The film for the delamination-proof layer 4 was formed with Resin B by the spraying method, and the thickness thereof was 20 μm. The curing method was carried out in the same manner as in Embodiment 1. The material, the film-forming method and the curing method for the protective layer 3 were the same as those used in Embodiment 1. Once the disc was completed, the above described delamination test was carried out. The results were satisfactory.

Embodiment 10

Embodiment 10 is applied to the phase change disc.

The substrate 1 was made by blending polycarbonate and polystyrene and had a thickness of 1.2 mm. The fine pattern (a groove width of 0.4 μm; and a track pitch of 1.6 μm) 1A was engraved on the surface of the substrate 1 as information. A phase change film AgInSbTe with a thickness of 100 nm was formed on the signal surface of the substrate 1 by the sputtering method to form the recording later 2. The delamination-proof layer 4 was formed in the same manner as in Embodiment 3, except that the film was formed by using the bar coating method to have a thickness of 15 μm. The protective layer 3 was also formed in the same way as for Embodiment 3. The above described delamination test was then carried out. The results were satisfactory.

Embodiment 11

Embodiment 11 is applied to the write-once disc, CD-R.

The substrate 1 was of polycarbonate and had a thickness of 1.2 mm. The fine pattern (a groove width of 0.6 μm; and a track pitch of 1.6 μm) 1A was engraved on the surface of the substrate 1 as information. A write-once azo dye film with a thickness of 150 nm was formed on the signal surface of the substrate 1 by the spin coating method to form the recording layer 2, and the a silver film with a thickness of 60 nm was formed by the evaporation method to serve as the optical reflective film. The delamination-proof layer 4 was made by adding 5% azobisisobutyronitrile, a thermosetting agent, to a monomer CL-50, and then rolling this onto the recording layer 2 by the roll coating method to form a thickness of 9 μm. The delamination-proof layer 4 was cured by being conveyed through an oven at 70° C. for 30 minutes. Resin β with a thickness of 7 μm was applied onto the delamination-proof layer 4 by the spin coating method to form the protective layer 3, and was cured with an ultraviolet lamp similar to that in Embodiment 1. The delamination test was carried out in the same manner as described above. The results were satisfactory.

Embodiment 12

Embodiment 12 is applied to the write-once disc, CD-R.

The substrate 1 was of polycarbonate and had a thickness of 1.2 mm. The fine pattern (a groove width of 0.6 μm; and a track pitch of 1.6 μm) 1A was engraved on the surface of the substrate 1 as information. A write-once cyanine dye film having a thickness of 120 nm was formed on the signal surface of the substrate 1 by the spin coating method to form the recording layer 2, and further a gold film having a thickness of 70 nm was formed by the sputtering method to serve as the optical reflective film. Resin B having a thickness of 12 μm which was applied onto the recording layer 2 by the spin coating method to from the delamination-proof layer 4. This was then cured by microwave irradiation for 5 minutes. Resin β having a thickness of 7 μm was applied onto the delamination-proof layer 4 by the spin coating method to from the protective layer 3. It was cured with an ultraviolet lamp similar to that in Embodiment 1. The delamination test was carried out in the same manner as described above. The results were satisfactory.

Embodiment 13

Embodiment 13 is applied to the super high-density read-only disc from which data is read from the signal surface side.

The substrate 1 was of polycarbonate and had a thickness of 1.2 mm. The fine pattern (a pit width of 0.15 μm; pits with ten different lengths; and a track pitch of 0.4 μm) 1A was engraved on the surface of the substrate 1 as information. An optical reflective film AlTi with a thickness of 60 nm was formed on the signal surface of the substrate 1 by the sputtering method to form the recording layer 2. Resin C having a thickness of 30 μm was applied onto the recording layer 2 by the screen printing method to form the delamination-proof layer 4. This was then cured with an ultraviolet lamp in the same manner as in Embodiment 1.

The application and the curing were carried out three times. Resin β with a thickness of 10 μm was applied onto the delamination-proof layer 4 by the spin coating method to form the protective layer 3. This was cured with an ultraviolet lamp similar to that in Embodiment 1. The delamination test was carried out in the same manner as previously described. The results were satisfactory. Silica glass including lamination of the delamination-proof layer 4 and the protective layer 3 is prepared. Light transmissivity test of the silica glass to light of 532 nm wavelength showed 82% of transmissivity.

Embodiment 14

Embodiment 14 is applied to the short wavelength-compatible magneto-optical disc.

The substrate 1 was of glass and had a thickness of 1.2 mm. The fine pattern (a groove width of 0.4 μm; and a track pitch of 0.9 μm) 1A was etched on the surface of the substrate 1 as information. A cobalt film (0.5 nm) and a platinum film (0.5 nm), both optical magnetic mediums, were alternately laminated to form 20 layers on the signal surface of the substrate 1 to form the recording layer 2 by the sputtering method. Resin D with a thickness of 20 μm was applied onto the recording layer 2 by the spraying method to form the delamination-proof layer 4. This was then cured by continuous irradiation by an electron ray for 30 seconds. The material, the film-forming method and the curing method for the protective layer 3 were the same as those used in Embodiment 1. Once, the disc was completed, the above described delamination test was carried out. The results were satisfactory.

Embodiment 15

Embodiment 15 is applied to the short wavelength-compatible magneto-optical magnetic disc.

The substrate 1 was made of Zeonex 280, a type of amorphous polyolefin and had a thickness of 1.2 mm. The fine pattern (a groove width of 0.4 μm; and a track pitch of 0.9 μm) 1A was engraved on the surface of the substrate 1 as information. An optical interference film SiN with a thickness of 80 nm, a magnetic-optical film NdFeCo with a thickness of 90 nm, an optical interference film SiN with a thickness of 80 nm, and an optical reflective film AlTa with a thickness of 80 nm were applied to the signal surface of the substrate 1 by the sputtering method to form the recording layer 2. The delamination-proof layer 4 and the protective layer 3 were formed in the same manner as in Embodiment 2. Once, the disc was completed, the above described delamination test was carried out. The results were satisfactory.

Embodiment 16

Embodiment 16 is applied to the high-density magneto-optical disc ASMO.

The substrate 1 was of polycarbonate and had a thickness of 0.6 mm (provided that the center clamp part has a thickness of 1.2 mm). The fine pattern (a groove width of 0.3 μm; and a track pitch of 0.6 μm) 1A was engraved on the surface of the substrate 1 as information. An optical interference film SiN with a thickness of 80 nm, an optical magnetic film GdFeCo with a thickness of 40 nm, a magneto-optical film TeFeCo with a thickness of 60 nm, an optical interference film SiN with a thickness of 60 nm, and an optical reflective film AlTi with a thickness of 70 nm were applied to the signal surface of the substrate 1 by the sputtering method to form the recording layer 2. A 10% 1.6-hexanedioldiacrylate, a monomer, is added to Resin D, to which lowered the viscosity to form the 7 μm-thick lamination-proof layer 4 by the spin coating method. The delamination-proof layer 4 was cured in the same manner as in Embodiment 1. The material, the film-forming method and the curing method for the protective layer 3 were the same as those in Embodiment 1. An SiO layer was formed on the reading surface of the substrate 1 by the sputtering method in order to correct warpage and prevent moisture. The delamination test was carried out in the same manner as previously described. The results were satisfactory.

Embodiment 17

Embodiment 17 is applied to the laminated phase change disc DVD-RAM.

The substrate 1 was of polycarbonate and had a thickness of 0.6 mm. The fine pattern (a grove width of 0.7 μm; and a track pitch of 1.48 μm) 1A was engraved on the surface of the substrate 1 as information. Two substrates 1 were prepared, and an optical interference film ZnSSiO with a thickness of 90 nm, a phase change film GeSbTe with a thickness of 20 nm, an optical interference film ZnSSiO with a thickness of 20 nm and an optical reflective film AlCr with a thickness of 150 nm were formed on each signal surface of the substrates 1 by the sputtering method to serve the recording layer 2. The delamination-proof layer 4 and the protective layer 3 were formed in the same manner as in Embodiment 8. SK-7000 (Sony Chemical) with a thickness of 30 μm was printed on the protective layer 3 by the screen printing method, and was irradiated with ultraviolet light of 500 mJ. This was laminated with the other disc and pressed thereon. The laminated disc was aged by standing upright for 24 hours. Once the disc was completed, it was separated into two half discs with a cutter knife. The previously described delamination test was carried out. The results were satisfactory.

Embodiment 18

Embodiment 18 is applied to the laminated disc DVD of dual-layer read-only type.

The substrate 1 was of polycarbonate and had a thickness of 0.6 mm. The fine pattern (a pit width of 0.3 μm; a pit with ten different lengths; and a track pitch of 0.74 μm) 1A was engraved on the surface of the substrate 1 as information. Two substrates 1 were prepared. A gold film, an optical reflective film with a thickness of 14 nm was formed on the signal surface of one of the substrates 1 by the sputtering method to serve as the recording layer 2, and an alloy A6061 mainly including aluminum, with a thickness of 60 nm was formed on the signal surface of the other of the substrates 1 by the sputtering method to serve as the optical reflective film. Resin E with a thickness of 15 μm was formed on each of the recording layers 2 by the spinning method, and was cured in the same manner as in Embodiment 1. One of the half discs was rotated with a spinner at a low speed, and Resin α was applied thereto to serve as a protective film and an adhesive. The half disc was laminated with the other half disc while avoiding intrusion of any air bubbles during rotation, and the laminated disc was rotated at 1500 rpm to shake off excessive resin. Ultraviolet light of 100 mJ was applied thereto from the gold film side to complete adhesion and complete the disc. The thickness of the resin between the gold film and the A6061 film was 45 μm. The laminated disc was then separated into two half discs with a cutter knife. The previously described delamination test was carried out. The results were satisfactory.

Embodiment 19

Embodiment 19 is applied to the laminated disc DVD of dual-layer read-only type.

The substrate 1 was of polycarbonate and had a thickness of 0.6 mm. The fine pattern (a pit width of 0.3 μm; a pit with ten different lengths; and a track pitch of 0.74 μm) 1A was engraved on the surface of the substrate 1 as information. Two substrates 1 were prepared. An optical reflective film SiN with a thickness of 40 nm was formed on the signal surface of one of the substrates 1 by the sputtering method to form the recording layer 2. And, a chromium film with a thickness of 100 nm was formed on the signal surface of the other of the substrates 1 by the sputtering method to serve as the optical reflective film. Resin E with a thickness of 20 μm was formed on each of the recording layers 2 by the spinning method, and was cured in the same manner as in Embodiment 1. One of the half discs was rotated with a spinner at a low speed, and Resin β was applied thereto as a protection film and an adhesive. One half disc was laminated with the other half disc while avoiding intrusion of any air bubbles during rotation, and the laminated disc was rotated at 2000 rpm to shake off excessive resin. Ultraviolet light of 1000 mJ was applied thereto from the SiN-coated substrate side to complete adhesion and complete the disc. The thickness of the resin between the SiN film and the chromium film was 45 μm. The laminated disc was then separated into two half discs with a cutter knife. The previously described delamination test was carried out. The results were satisfactory.

The information recording carrier according to the present invention constructed as described above is comprised of a delamination-proof layer of a resin with a stretch rate of 100%–300% and a protection layer of a resin with a stretch rate of 5% or less superposed on the recording layer; so that, for example, the recording layer cannot be delaminated at the interface between the substrate and the recording layer even with an adhesive tape. Thus, the unlawful copying of the disc by the physical copying method is prevented, and a manufacturing method for the information recording carrier is provided.

Furthermore, since the recording layer includes a single layer or a laminated construction of one or a combination of optical reflective film, magneto-optical film, phase change film or a dye film, the physical copying method of the substrate can be prevented in disc with such recording layer.

What is claimed is:

1. An information recording carrier having a substrate with at least one fine pattern row, comprising a recording layer, a delamination-proof layer and a protective layer, sequentially superposed on the substrate, the delamination-proof layer including a resin with a stretch rate of 100%–300% and the protective layer including a resin with a stretch rate of 5% or less.

2. The information recording carrier according to claim 1, wherein the recording layer includes a single layer or a multi-layer construction of at least either an optical reflective film, a magneto-optical layer, a phase change film or a dye film.

3. The information recording carrier according to claim 2, wherein the optical reflective film includes either aluminum, gold, silver, silicon, titanium, tantalum, or chromium.

4. The information recording carrier according to claim 2, wherein the optical reflective film includes an alloy with either aluminum, gold, silver, silicon, titanium, tantalum or chromium.

5. The information recording carrier according to claim 2, wherein the magneto-optical film includes at least one of TbFeCo, GdFeCo, NdFeCo, cobalt and platinum.

6. The information recording carrier according to claim 2, wherein the phase change film includes at least GeSbTe or AgInSbTe.

7. The information recording carrier according to claim 2, wherein the dye film includes at least a cyanine dye or an azo dye.

8. The information recording carrier according to claim 1, wherein the delamination-proof layer includes at least a radiation curing resin, a thermosetting resin or an electron ray curing resin.

9. The information recording carrier according to claim 1, further comprising a test piece provided on the protective layer so that the recording layer is not delaminated from the substrate against a delamination test to delaminate the test piece.

10. The information recording carrier according to claim 1, a dual layer of the delamination and protective layers exhibits a light transmissivity of 70% or more.

11. A method of manufacturing an information recording carrier comprising the steps of:

forming a recording layer on a substrate with at least one fine pattern row;

applying a first resin including a resin with a stretch rate of 100%–300% onto the recording layer;

curing the first resin applied onto the recording layer to form a delamination-proof layer;

applying a second resin including a resin with a stretch rate of 5% or less onto the delamination-proof layer; and curing the second resin applied onto the delamination-proof layer to form a protective layer.

12. The method of manufacturing an information recording carrier according to claim 11, wherein the step of applying the first resin is carried out using either a spin coating method, a bar coating method, a roll coating method, a spraying method, an immersing method or a printing method.

13. The method of manufacturing an information recording carrier according to claim 11, wherein the step of curing the first resin is carried out using either a radiation irradiation method, an electron ray irradiation method, or a baking method, or a combination thereof.

14. The method of manufacturing an information recording carrier according to claim 13, wherein the baking method is carried out by a heater at temperature of 50° C.–150° C. or by an infrared ray.

* * * * *